(12) United States Patent
Li et al.

(10) Patent No.: US 10,185,187 B2
(45) Date of Patent: Jan. 22, 2019

(54) DISPLAY DEVICE AND MANUFACTURING METHOD THEREOF

(71) Applicant: BOE TECHNOLOGY GROUP CO., LTD., Beijing (CN)

(72) Inventors: Wenbo Li, Beijing (CN); Xinyin Wu, Beijing (CN); Hongfei Cheng, Beijing (CN); Pan Li, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 208 days.

(21) Appl. No.: 14/893,621

(22) PCT Filed: May 29, 2015

(86) PCT No.: PCT/CN2015/080194
§ 371 (c)(1),
(2) Date: Nov. 24, 2015

(87) PCT Pub. No.: WO2016/110044
PCT Pub. Date: Jul. 14, 2016

(65) Prior Publication Data
US 2016/0198585 A1    Jul. 7, 2016

(30) Foreign Application Priority Data

Jan. 7, 2015   (CN) .................... 2015 2 0009653 U (51) Int. Cl.
*H05K 1/11*    (2006.01)
*H05K 1/14*    (2006.01)
(Continued)

(52) U.S. Cl.
CPC .. *G02F 1/134309* (2013.01); *G02F 1/133707* (2013.01)

(58) Field of Classification Search
CPC ..................... G02F 1/133707; G02F 1/134309
See application file for complete search history.

(56) References Cited

U.S. PATENT DOCUMENTS

| | | | |
|---|---|---|---|
| 8,619,224 B2 | 12/2013 | Chae et al. | |
| 2007/0132374 A1* | 6/2007 | Park .................... | H01L 27/3253 313/504 |

(Continued)

FOREIGN PATENT DOCUMENTS

| | | | |
|---|---|---|---|
| CN | 102707504 A | | 10/2012 |
| CN | 203433244 | * | 2/2014 |

(Continued)

OTHER PUBLICATIONS

Search Report and Written Opinion dated Sep. 25, 2015 from State Intellectual Property Office of the P.R. China.

*Primary Examiner* — Yuriy Semenenko
(74) *Attorney, Agent, or Firm* — Ditsworth & Barrese, LLP; Michael J. Musella, Esq (57) ABSTRACT

A display device and a manufacturing method thereof are disclosed. The display device includes a first substrate (S1) and a second substrate (S2) arranged opposite to each other; a common electrode (6) is disposed in a display area (A1) of the first substrate (S1); a plurality of first protrusions (1) are formed in a frame area (A2); the first protrusions (1) include first protrusion bodies (11) and first contact electrodes (12) disposed on top of the first protrusion bodies (11); the first contact electrodes (12) are electrically connected with the common electrodes (6); first common electrode signal lines (5) are disposed in a frame area (A2) of the second substrate (S2); and the first contact electrodes (12) are electrically connected with the first common electrode signal lines (5). The display device can simplify the overall manufacturing process of the display device.

20 Claims, 5 Drawing Sheets

(51) Int. Cl.
   *G02F 1/1343*   (2006.01)
   *G02F 1/1337*   (2006.01)

(56) References Cited

U.S. PATENT DOCUMENTS

| | | | |
|---|---|---|---|
| 2012/0019755 A1* | 1/2012 | Tokuoka | G02F 1/133707 349/128 |
| 2012/0300158 A1* | 11/2012 | Chae | G02F 1/1343 349/106 |
| 2016/0202514 A1* | 7/2016 | Li | G02F 1/1339 349/106 |
| 2016/0299392 A1* | 10/2016 | Cheng | G02F 1/133707 |
| 2017/0244068 A1* | 8/2017 | Cheng | H01L 51/5259 |

FOREIGN PATENT DOCUMENTS

| | | |
|---|---|---|
| CN | 203433244 U | 2/2014 |
| CN | 204302637 U | 4/2015 |
| JP | H06301042 A | 10/1994 |

* cited by examiner

DISPLAY DEVICE AND MANUFACTURING METHOD THEREOF

TECHNICAL FIELD

At least one embodiment of the present invention relates to a display device and a manufacturing method thereof.

BACKGROUND

A display panel generally comprises: a color filter (CF) substrate and an array substrate arranged opposite to each other, and liquid crystals encapsulated between the CF substrate and the array substrate. For instance, common electrodes may be disposed on the CF substrate; pixel electrodes and common electrode lines are disposed on the array substrate; and conductive elements such as conductive metal balls are disposed in corresponding frame area between the CF substrate and the array substrate. One end of the conductive element is connected with the common electrode on the CF substrate and the other end is connected with the common electrode line on the array substrate, so that external common electrode voltage signals can be conducted to the common electrode through the common electrode line and the conductive elements.

SUMMARY

At least one embodiment of the present invention provides a display device and a manufacturing method thereof, the manufacturing process of which is relatively simple.

At least one embodiment of the present invention provides a display device, which comprises: a first substrate and a second substrate arranged opposite to the first substrate. A common electrode is disposed in a display area of the first substrate; a plurality of first protrusions are formed in a frame area; the first protrusions include first protrusion bodies and first contact electrodes disposed on the top of the first protrusion body; the first contact electrodes are electrically connected with the common electrode; first common electrode signal lines are disposed in a frame area of the second substrate; and the first contact electrodes are electrically connected with the first common electrode signal lines.

At least one embodiment of the present invention further provides a method for manufacturing a display device, which comprises: forming a first substrate, in which a common electrode is disposed in a display area of the first substrate, first protrusions are formed in a frame area, the first protrusion include first protrusion bodies and first contact electrodes disposed on top of the first protrusion bodies, the first contact electrodes are electrically connected with the common electrode; and forming a second substrate arranged opposite to the first substrate, in which first common electrode signal lines are disposed in a frame area of the second substrate, and the first contact electrodes are electrically connected with the first common electrode signal lines.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

REFERENCE NUMERALS

1—First Protrusion; 11—First Protrusion Body; 12—First Contact Electrode; 2—Second Protrusion; 3—Third Protrusion; 31—Third Protrusion Body; 32—Second Contact Electrode; 311—Gate Metal; 312—Source/Drain Metal; 4—Fourth Protrusion; 42—Third Contact Electrode; 5—First Common Electrode Signal Line; 5'—Second Common Electrode Signal Line; 6—Common Electrode; 7—Common Electrode Line; A1—Display Area; A2—Frame area; S1—First Substrate; S2—Second Substrate.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

The inventors of the application have noted in the study that: in order to achieve the electrical connection between common electrodes and common electrode lines in a display panel, the step of forming conductive elements, e.g., the step of screen printing or dispensing of conductive adhesive, must be additionally employed, so that the manufacturing process of the display panel can become complicated.

First Embodiment

Figure 1:
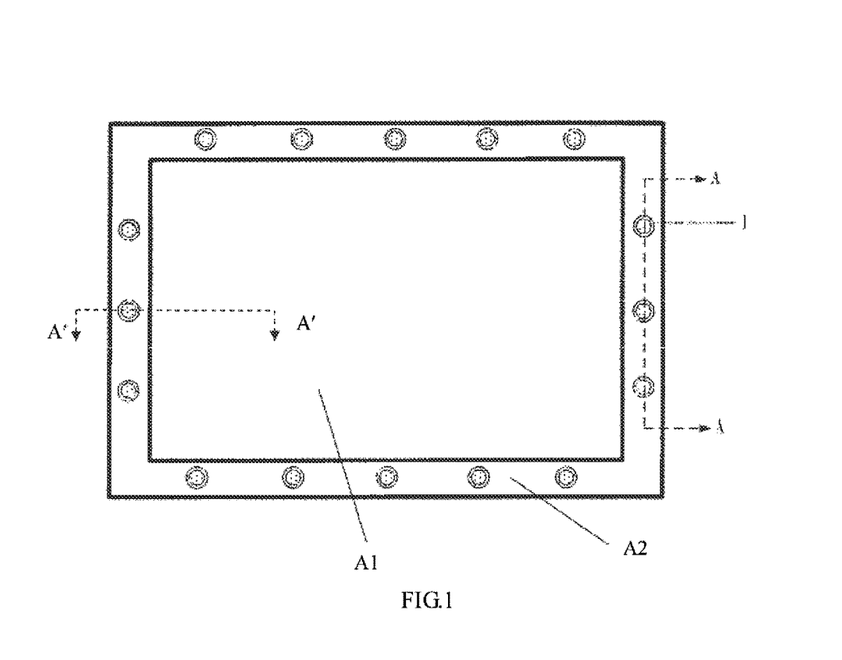
FIG. 1 is a plan view of a display device provided by a first embodiment of the present invention.
Figure 2A:
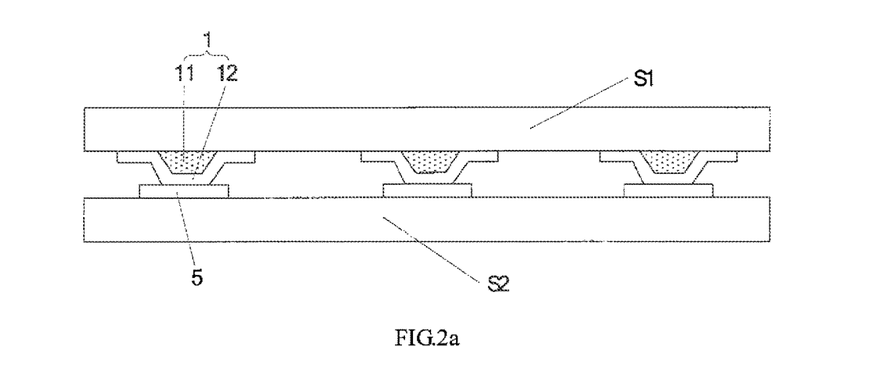
FIG. 2a is a sectional view of the display device as illustrated in FIG. 1 along dotted line AA.
Figure 2B:
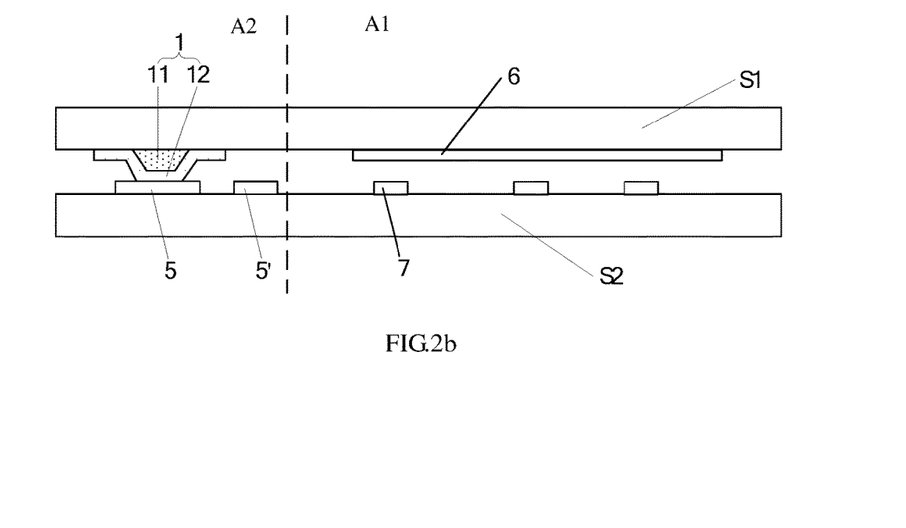
FIG. 2b is a sectional view of the display device as illustrated in FIG. 1 along dotted line A'A'.

This embodiment provides a display device. As illustrated in FIGS. 1, 2a and 2b, the display device comprises: a first substrate S1 and a second substrate S2 arranged opposite to the first substrate S1. Common electrodes 6 are disposed in a display area A1 of the first substrate S1; a plurality of protrusions 1 are formed in a frame area A2; a first protrusion 1 includes a first protrusion body 11 and a first contact electrode 12 disposed on the top of the first protrusion body 11; the first contact electrode 12 is electrically connected with a common electrode 6; first common electrode signal lines (e.g., first common electrode voltage signal lines) 5 are disposed in a frame area A2 of the second substrate S2; and the first contact electrode 12 is electrically connected with a first common electrode signal line 5.

In the display device provided by the embodiment, the first protrusions 1 are formed in the frame area A2 of the first substrate S1; and a first protrusion includes a first protrusion body 11 and a first contact electrode 12 disposed on the top of the first protrusion body 11, so that a first common electrode signal line 5 on the second substrate S2 can be electrically connected with the common electrode on the first substrate S1 via the first contact electrode 12. The display device with the structure does not require the additional step of screen printing of conductive metal balls or dispensing of conductive adhesive for the electrical connection between the first common electrode signal line and the first contact electrode, and hence the manufacturing process of the display device can be simplified.

As spacers for supporting the cell gap of a display are disposed in the display area A1 of the display device, for instance, the first protrusion body 11 and the spacers in the display area A1 may be formed in the same step, so that the step of forming the first protrusion body 11 is not additionally required, and hence the manufacturing process of the device can be further simplified.

It should be noted that: in order to reduce the stress over the display area A1 of the display, the spacers in the display area A1 may be designed as follows: the spacers in the display area A1 include first spacers and second spacers; the height of the first spacers is greater than that of the second spacers, so that a step can be formed between the first spacers and the second spacers; and when the display is pressed, the second spacers can provide a certain supporting force for the display. On the basis of the above structure, for instance, the height of the first protrusion 1 may be the same as the height of the first spacers and the height of the first protrusion body 11 may be the same as the height of the second spacers. For instance, in the manufacturing process, the first protrusion bodies 11, the first spacers and the second spacers may be formed in one patterning process by a gray-tone mask process, so that a step can be formed between the first spacers and the second spacers.

As the common electrodes are formed on the first substrate S1, for instance, the first contact electrodes 12 and the common electrodes may be formed in the same layer, so that the step of forming the first contact electrodes 12 and the step of forming the common electrodes can be integrated into one, and hence the manufacturing process can be further simplified.

It should be noted that a first contact electrode 12 may only include a portion disposed on the top of a first protrusion body 11 or may cover all the surface of an whole first protrusion body 11 except the surface making contact with the first substrate S1 (as illustrated in FIG. 2a).

As illustrated in FIG. 1, in the embodiment, the first protrusions 1 may be formed in the corresponding frame area of at least one edge of the display device. For instance, if the electrical connection of all the four edges is required, the first protrusions 1 may be formed in the corresponding frame area of the four edges. For instance, the first protrusions 1 may be uniformly distributed in the corresponding frame area of one edge, so that the signal delay of various portions of the common electrode can be kept consistent. For instance, the first protrusions may be symmetrically distributed in the corresponding frame area of two opposite edges, so that signal loss can be reduced.

For instance, a first protrusion body 11 may be made from an insulation material such as resin so as to avoid signal loss that is caused due to the conduction of electrical signals to a first contact electrode 12 to a layer below the first contact electrode 12 (namely between the first protrusion body 11 and the first substrate S1) through the first protrusion body 11.

In the embodiment, the first substrate S1 may be a CF substrate, and therefore a black matrix (BM) layer, a CF layer and an optical cement layer may also be disposed below the first protrusions 1.

As illustrated in FIG. 2b, the second substrate S2 may be an array substrate; a plurality of common electrode lines 7 may be disposed in the display area A1 and, for instance, may be electrically connected with first common electrode signal lines 5; power may be supplied to the common electrode on the first substrate S1 and the common electrodes line on the second substrate S2 via the first common electrode signal lines 5, so that the number of external wirings can be reduced; or second common electrode signal lines (e.g., second common electrode voltage signal lines) 5' may be independently disposed in the frame area A2 of the second substrate S2, so that the common electrode line 7 is electrically connected with the second common electrode signal line 5', namely power is supplied to the common electrode lines via the second common electrode signal lines, and hence power can be respectively and independently supplied to the common electrode on the first substrate S1 and the common electrode lines on the second substrate S2, and consequently the common electrode and the common electrode lines can have different electrical potentials.

Second Embodiment

In order to reduce the stress in the frame area, second protrusions are formed in the frame area of the display device provided by the embodiment, so that a step can be formed between the second protrusions and the first protrusions.

Figure 3:
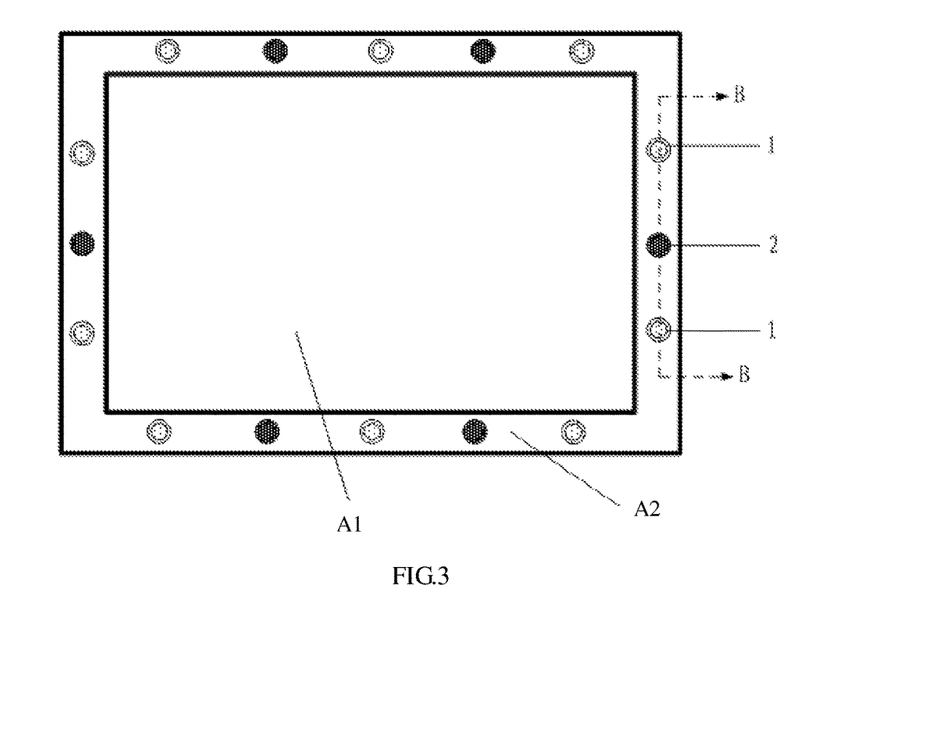
FIG. 3 is a plan view of a display device provided by a second embodiment of the present invention.
Figure 4:
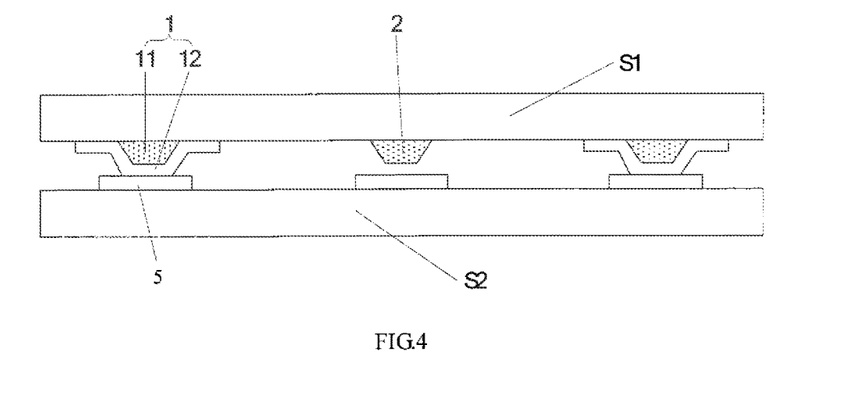
FIG. 4 is a sectional view of the display device as illustrated in FIG. 3 along dotted line BB.

As illustrated in FIGS. 3 and 4, the frame area A2 of the first substrate S1 of the display device is not only provided with the first protrusions 1 but also provided with the second protrusions. The height of the second protrusions 2 is less than the height of the first protrusions 1, so that a step can be formed between the first protrusion 1 and the second protrusion 2, and hence the stress of the display when pressed can be reduced and the problem of reduced display quality due to overlarge local stress of the display can be solved.

A first protrusion 1 includes a first protrusion body 11 and a first contact electrode 12, while no contact electrode is disposed on the top of a second protrusion 2. For instance, the second protrusions 2 may be formed in the same layer as the first protrusion bodies 11, so that the step of forming the first protrusion bodies 11 and the step of forming the second protrusions 2 can be integrated into one, thus the manufacturing process can be further simplified. For instance, the first protrusion bodies 11, the second protrusions 2, and the first spacers and the second spacers in the display area A1 may be formed simultaneously in the same step, and therefore the manufacturing process can be further simplified.

Figure 5:
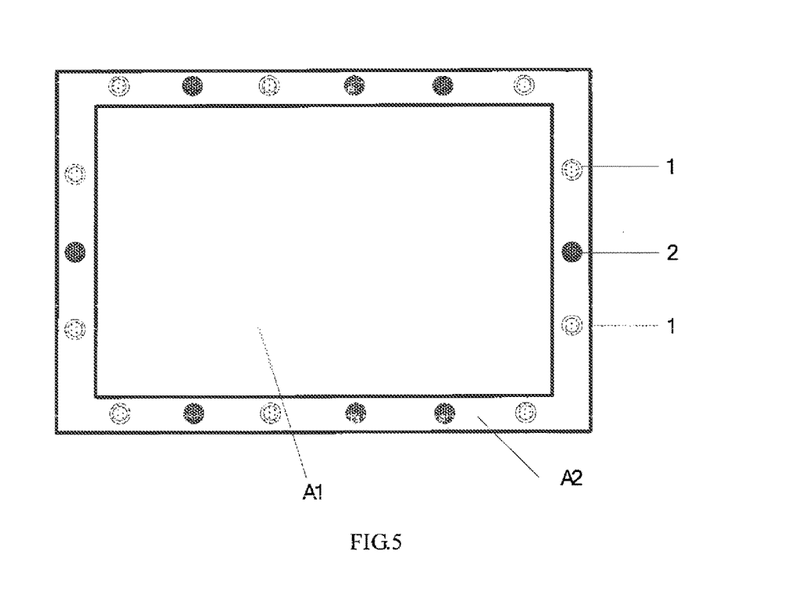
FIG. 5 is a plan view of another display device provided by the second embodiment of the present invention.
Figure 6:
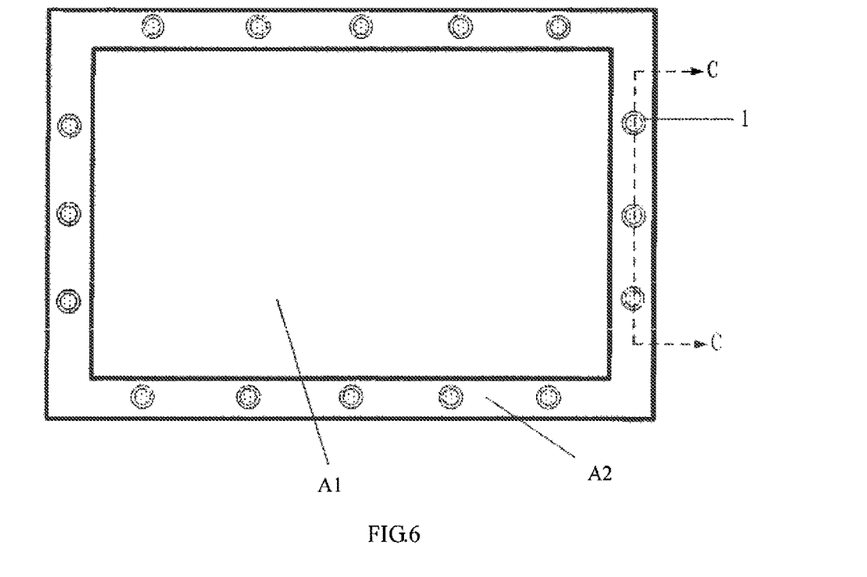
FIG. 6 is a plan view of a display device provided by a third embodiment of the present invention.

As illustrated in FIGS. 3 and 5, the first protrusions 1 and the second protrusions 2 may be formed in the corresponding frame area of at least one edge of the first substrate S1. For instance, if the electrical connection of four edges is required, the first protrusions 1 and the second protrusions 2 may be formed in corresponding frame area of the four edges. For instance, at least one second protrusion 2 may be formed between two adjacent first protrusions 1 in the corresponding frame area of one edge, so that the stress of the frame area A2 can be further reduced, and therefore the stress of various portions of the frame area A2 can be uniform. Moreover, for instance, the first protrusions 1 and the second protrusions 2 may be equally spaced in the corresponding frame area of one edge, so that the signal delay of various portions of the common electrode can be kept consistent and the stress of various portions of the display can be kept uniform.

Third Embodiment

In the display device provided by this embodiment, the height of the protrusions in the frame area A2 of the first substrate S1 is consistent with each other, and a step is formed by the arrangement of third protrusions in the frame area A2 of the second substrate S2.

As illustrated in FIGS. 6 to 9, the frame area A2 of the first substrate S1 is only provided with the first protrusions 1, namely the height of the protrusions is consistent with each other; the frame area A2 of the second substrate S2 is provided with a plurality of third protrusions 3, the number of which is less than the number of the first protrusions 1. Each third protrusion 3 corresponds to the position of one first protrusion 1; the third protrusion 3 includes a third protrusion body 31 and a second contact electrode 32 disposed on the top of the third protrusion body 31; and the second contact electrode 32 is electrically connected with a first common electrode signal line and makes contact with a first contact electrode 12. As the number of the third protrusions 3 is less than that of the first protrusions 1, the cell gap of the display at positions provided with both the first protrusions 1 and the third protrusions 3 in the direction perpendicular to the display device will be greater than that of other positions, so that a step can be formed in the display, and hence the stress of the display when pressed can be reduced.

Figure 7:
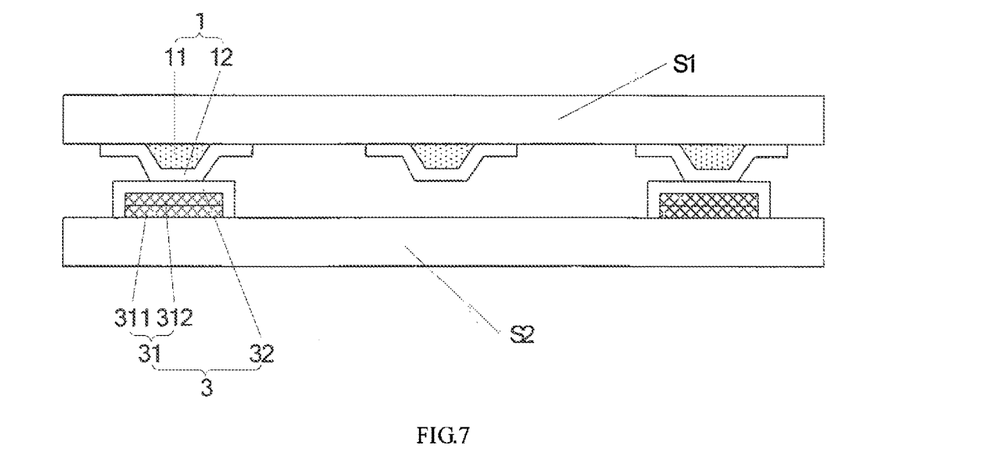
FIGS. 7 to 9 are three sectional views of the display device as illustrated in FIG. 6 along dotted line CC.

For instance, as illustrated in FIG. 7, a step may be formed by forming the third protrusions 3 corresponding to a portion of the first protrusions 1 and not forming the protrusions corresponding to rest first protrusions 1.

Figure 8:
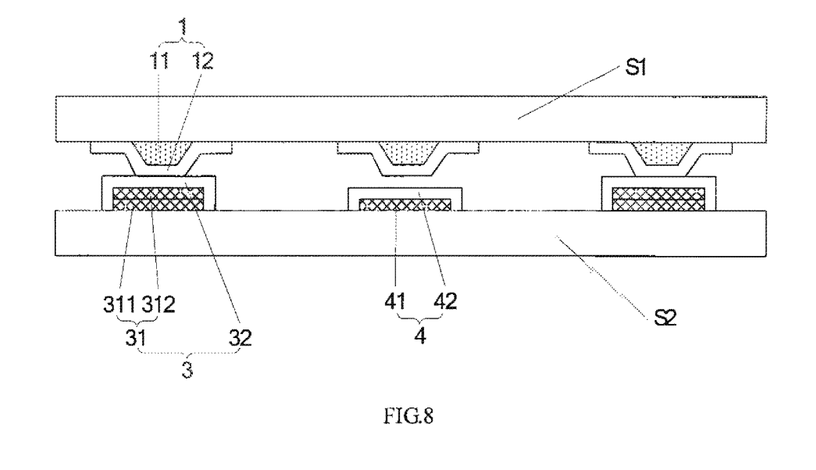
Figure 9:
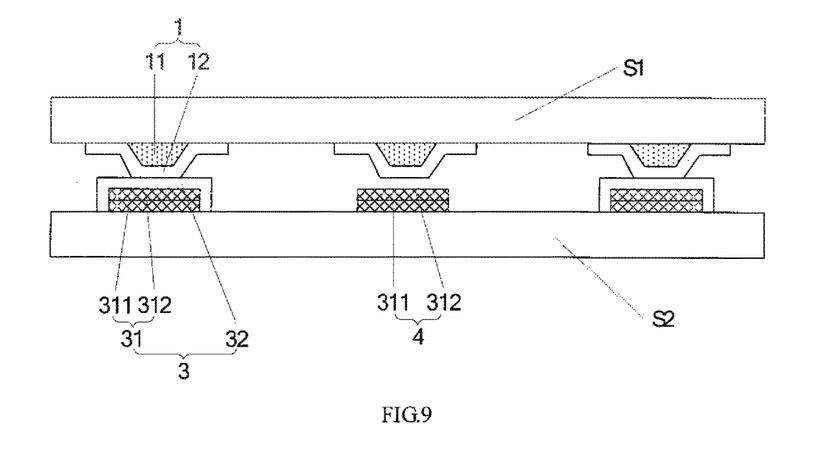

As illustrated in FIGS. 8 and 9, a plurality of fourth protrusions 4 may be formed in the frame area A2 of the second substrate S2; the sum of the number of the fourth protrusions 4 and the number of the third protrusions 3 is equal to the number of the first protrusions 1. Each fourth protrusion 4 corresponds to one first protrusion 1; and the height of the fourth protrusion 4 is less than that of a third protrusion 3, so that a step can be formed. By arrangement of the fourth protrusions 4, the step in the frame area A2 cannot be too large, and hence the stress can be further reduced.

The structure of a fourth protrusion 4 may be as illustrated in FIG. 8 and includes a fourth protrusion body 41 and a third contact electrode 42 disposed on the top of the fourth protrusion body 41. After the corresponding position of the fourth protrusion 4 is pressed, the third contact electrode 42 is electrically connected with a first common electrode signal line and can make contact with a first contact electrode 12, so that a voltage can be applied to the common electrode at the corresponding position of the fourth protrusion 4 through the third contact electrode 42 and the first contact electrode 12, and hence signal loss can be reduced. For instance, the height of the fourth protrusion body 41 may be less than that of the third protrusion body 31, and the third contact electrodes 42 are formed in the same layer as the second contact electrodes 32, so that the step of forming the second contact electrodes 32 and the step of forming the third contact electrodes 42 are integrated into one, and therefore the manufacturing process can be simplified.

The structure of a fourth protrusion 4 may also be as illustrated in FIG. 9. The fourth protrusion may be formed fully, synchronously with the third protrusion body 31, and no electrode is disposed on the top.

A plurality of films are formed on the second substrate S2, and the third protrusion bodies 31 may be formed by the stack of at least two layers in the plurality of films, so that the third protrusion bodies 31 are formed when the plurality of films on the second substrate S2 are formed, and hence the manufacturing process can be simplified. On the basis of this, in the structure as illustrated in FIG. 8, the fourth protrusion bodies 41 may be formed by the stack of at least one layer in the plurality of films and the number of the layers for forming the third protrusion bodies 31 is greater than the number of the layers for forming the fourth protrusion bodies 41, so that the height of the fourth protrusion bodies 41 is less than that of the third protrusion bodies 31, and the step of forming the fourth protrusion bodies 41 may also be compatible with the step of forming the plurality of films. In the structure as illustrated in FIG. 9, both the third protrusion bodies 31 and the fourth protrusions 4 are formed by the stack of at least one layer in the plurality of films; the films for forming the third protrusion bodies 31 are the same as the films for forming the fourth protrusions 4; but no electrode is disposed on the top of each fourth protrusion, so that the height of the fourth protrusions 4 may also be less than that of the third protrusions 3, and the step of forming the fourth protrusions 4 and the step of forming the plurality of films can be integrated into one.

It should be noted that the second substrate S2 in the embodiment may be an array substrate and the plurality of films of the second substrate S2 may include a gate metal layer, a gate insulating layer, an active layer, a source/drain metal layer, a passivation layer, a planarization layer, a pixel electrode layer and the like; and the films for forming the third protrusion bodies 31 may be at least two of the foregoing films. For instance, a third protrusion body 31 may be formed with a gate metal 311 and a source/drain metal 312, so that the resistance of the third protrusion 3 is the parallel resistance of the second contact electrode 32, the gate metal 311 and the source/drain metal 312, and therefore the resistance of the third protrusion 3 can be reduced, namely the transmission resistance from the first common electrode signal line to the common electrode can be reduced, thus the loss of electrical signals during the conduction can be reduced. In the example, the second contact electrode 32, the gate metal 311 and the source/drain metal 312 may be electrically connected with each other via a through hole or direct contact. Moreover, in the structure as illustrated in FIG. 8, the fourth protrusion body 41 may, for instance, be made from the gate metal or the source/drain metal, so that the overall resistance of the fourth protrusion 4 can be reduced; and in the structure as illustrated in FIG. 9, the fourth protrusion 4, for instance, may be formed by the gate metal 311 and the source/drain metal 312.

It should be noted that the gate metal 311 is not electrically connected with a gate electrode and a gate line on the array substrate, and the source/drain metal 312 is not electrically connected with a source electrode, a drain electrode and a data line on the array substrate.

The second contact electrodes 32 and the third contact electrodes 42, for instance, may be formed in the same layer as the pixel electrodes but are not electrically connected with the pixel electrodes, so that the steps of forming the second contact electrodes 32, the third contact electrodes 42 and the pixel electrodes are integrated, and hence the manufacturing process can be simplified. In addition, for instance, the common electrode lines on the second substrate S2 may be formed in the same layer as the gate metal, so that the second contact electrodes 32 and the third contact electrodes 42 may be electrically connected with the common electrode lines via through holes.

Fourth Embodiment

This embodiment provides a method for manufacturing a display device. The method comprises: forming a first substrate, in which common electrodes are disposed in a display area of the first substrate; a plurality of first protrusions are formed in a frame area, in which each first protrusion includes a first protrusion body and a first contact electrode disposed on the top of the first protrusion body; the first contact electrode is electrically connected with the common electrode; and forming a second substrate arranged opposite to the first substrate, in which first common electrode signal lines are disposed in a frame area of the second substrate, and the first contact electrode is electrically connected with a first common electrode signal line.

For instance, a plurality of second protrusions are also formed in the frame area of the first substrate, and the height of the second protrusion is less than that of the first protrusion.

For instance, a plurality of third protrusions, the number of which is less than that of the first protrusions, are formed in the frame area of the second substrate; each third protrusion corresponds to the position of one first protrusion; the third protrusion includes a third protrusion body and a second contact electrode disposed on the top of the third protrusion body; and the second contact electrode is electrically connected with a first common electrode signal line and makes contact with a first contact electrode.

For instance, a plurality of fourth protrusions are also formed in the frame area of the second substrate; the sum of the number of the fourth protrusions and the number of the third protrusions is equal to the number of the first protrusions; each fourth protrusion corresponds to the position of one first protrusion; and the height of the fourth protrusions is less than that of the third protrusions.

The design of various structures in the manufacturing method provided by the embodiment may be referred to the relevant description in the above embodiments 1 to 3. No further description will be given here.

The method for manufacturing the display device may further comprise the step of forming a liquid crystal cell by injecting liquid crystals between the first substrate and the second substrate. In some embodiments, the manufacturing method may further comprise the step of arranging a backlight on one side of the second substrate away from the first substrate so as to provide backlight for the display device. No further description will be given here.

In the display device and the manufacturing method thereof, provided by the embodiments of the present invention, the display device comprises the first substrate and the second substrate arranged opposite to each other; the common electrodes are disposed in the display area of the first substrate; the common electrode signal lines for transmitting common electrode voltage to the common electrodes are disposed in the frame area of the second substrates; the plurality of first protrusions are formed in the frame area of the first substrate; and each first protrusion includes the first protrusion body and the first contact electrode disposed on the top of the first protrusion body. Therefore, the common electrodes can be electrically connected with the first common electrode signal lines via the first contact electrodes, so that the step of screen printing of the conductive metal balls or dispensing of the conductive adhesive for the electrical connection between the first contact electrodes and the first common electrode signal lines can be omitted, and hence the overall manufacturing process of the display device can be simplified.

The foregoing is only the preferred embodiments of the present invention and not intended to limit the scope of protection of the present invention. The scope of protection of the present invention should be defined by the appended claims.

The application claims priority to the Chinese patent application No. 201520009653.6, filed on Jan. 7, 2015, the disclosure of which is incorporated herein by reference as part of the application.

The invention claimed is:

1. A display device, comprising:
    a first substrate, in which a common electrode is disposed in a display area of the first substrate, a plurality of first protrusions are formed in a frame area of the first substrate, the first protrusions include first protrusion bodies and first contact electrodes disposed on the first protrusion bodies; the first contact electrodes are electrically connected with the common electrode; and
    a second substrate arranged opposite to the first substrate, in which first common electrode signal lines are disposed in a frame area of the second substrate, and the first contact electrodes are electrically connected with the first common electrode signal lines,
    wherein the first protrusion bodies are made from an insulation material and the first protrusion bodies are in direct contact with the first contact electrodes; and orthographic projection regions of the first common electrode signal lines on the first substrate are outside an orthographic projection region of the common electrode on the first substrate.

2. The display device according to claim 1, wherein a plurality of second protrusions are also formed in the frame area of the first substrate, and a height of the second protrusions is less than that of the first protrusions.

3. The display device according to claim 2, wherein the second protrusions and the first protrusion bodies are formed in the same layer.

4. The display device according to claim 2, wherein the first protrusions and the second protrusions are formed in a corresponding frame area of at least one edge of the first substrate.

5. The display device according to claim 4, wherein at least one second protrusion is distributed between two adjacent first protrusions in a corresponding frame area of one edge.

6. The display device according to claim 2, wherein at least one second protrusion is distributed between two adjacent first protrusions in a corresponding frame area of one edge of the first substrate.

7. The display device according to claim 5, wherein the first protrusions and the second protrusions are equally spaced in the corresponding frame area of one edge.

8. The display device according to claim 1, wherein the first contact electrodes and the common electrode are formed in a same layer.

9. The display device according to claim 1, wherein
    a plurality of common electrode lines are disposed in a display area of the second substrate, and the common electrode lines are electrically connected with the first common electrode signal lines; or a plurality of common electrode lines are disposed in a display area of the second substrate, second common electrode signal lines are further disposed in the frame area of the second substrate, and the common electrode lines are electrically connected with the second common electrode signal lines.

10. The display device according to claim 3, wherein the first protrusions and the second protrusions are formed in a corresponding frame area of at least one edge of the first substrate.

11. The display device according to claim 3, wherein at least one second protrusion is distributed between two adjacent first protrusions in a corresponding frame area of one edge of the first substrate.

12. The display device according to claim 6, wherein the first protrusions and the second protrusions are equally spaced in the corresponding frame area of one edge.

13. A display device, comprising:
a first substrate, in which a common electrode is disposed in a display area of the first substrate, a plurality of first protrusions are formed in a frame area of the first substrate, the first protrusions include first protrusion bodies and first contact electrodes disposed on the first protrusion bodies; the first contact electrodes are electrically connected with the common electrode; and
a second substrate arranged opposite to the first substrate, in which first common electrode signal lines are disposed in a frame area of the second substrate, and the first contact electrodes are electrically connected with the first common electrode signal lines,
wherein a plurality of third protrusions, a number of which is less than a number of the first protrusions, are formed in the frame area of the second substrate; each third protrusion corresponds to a position of one first protrusion; the third protrusions include third protrusion bodies and second contact electrodes disposed on top of the third protrusion bodies, and the second contact electrodes are electrically connected with the first common electrode signal lines and make contact with the first contact electrodes.

14. The display device according to claim 13, wherein a plurality of fourth protrusions are also formed in the frame area of the second substrate; a sum of a number of the fourth protrusions and the number of the third protrusions is equal to the number of the first protrusions; each fourth protrusion corresponds to a position of one first protrusion; and a height of the fourth protrusions is less than that of the third protrusions.

15. The display device according to claim 14, wherein the fourth protrusions include fourth protrusion bodies and third contact electrodes disposed on top of the fourth protrusion bodies; a height of the fourth protrusion bodies is less than that of the third protrusion bodies; and the third contact electrodes are formed in the same layer as the second contact electrodes.

16. The display device according to claim 14, wherein a plurality of films are formed on the second substrate; the third protrusion bodies are formed by a stack of at least two layers in the plurality of films; the fourth protrusion bodies are formed by a stack of at least one layer in the plurality of films; and a number of the layers for forming the third protrusion bodies is greater than a number of the layers for forming the fourth protrusion bodies.

17. A method for manufacturing a display device, comprising:
forming a first substrate, in which a common electrode is disposed in a display area of the first substrate; a plurality of first protrusions are formed in a frame area of the first substrate, the first protrusion include first protrusion bodies and first contact electrodes disposed on the first protrusion bodies, and the first contact electrodes are electrically connected with the common electrode; and
forming a second substrate arranged opposite to the first substrate, in which first common electrode signal lines are disposed in a frame area of the second substrate, and the first contact electrodes are electrically connected with the first common electrode signal lines,
wherein the first protrusion bodies are made from an insulation material and the first protrusion bodies are in direct contact with the first contact electrodes; and the first contact electrodes and the common electrode are formed by a same layer.

18. The manufacturing method according to claim 17, wherein a plurality of second protrusions are also formed in the frame area of the first substrate, and a height of the second protrusions is less than that of the first protrusions.

19. The manufacturing method according to claim 17, wherein a plurality of third protrusions, a number of which is less than a number of the first protrusions, are formed in the frame area of the second substrate; each third protrusion corresponds to a position of one first protrusion; the third protrusions include third protrusion bodies and second contact electrodes disposed on top of the third protrusion bodies; and the second contact electrodes are electrically connected with the first common electrode signal lines and make contact with the first contact electrodes.

20. The manufacturing method according to claim 19, wherein a plurality of fourth protrusions are also formed in the frame area of the second substrate; a sum of a number of the fourth protrusions and the number of the third protrusions is equal to the number of the first protrusions; each fourth protrusion corresponds to a position of one first protrusion; and a height of the fourth protrusions is less than that of the third protrusions.

* * * * *